US009676276B2

(12) United States Patent
Niizuma

(10) Patent No.: US 9,676,276 B2
(45) Date of Patent: Jun. 13, 2017

(54) MOBILE POWER SUPPLY DEVICE

(71) Applicant: IHI Corporation, Tokyo (JP)

(72) Inventor: Motonao Niizuma, Tokyo (JP)

(73) Assignee: IHI CORPORATION (JP)

( * ) Notice: Subject to any disclaimer, the term of this patent is extended or adjusted under 35 U.S.C. 154(b) by 554 days.

(21) Appl. No.: 14/255,406

(22) Filed: Apr. 17, 2014

(65) Prior Publication Data
US 2014/0225433 A1    Aug. 14, 2014

Related U.S. Application Data

(63) Continuation of application No. PCT/JP2012/080502, filed on Nov. 26, 2012.

(30) Foreign Application Priority Data

Nov. 25, 2011  (JP) .................. 2011-257944

(51) Int. Cl.
*B60L 5/00* (2006.01)
*B60L 11/18* (2006.01)
(Continued)

(52) U.S. Cl.
CPC ............. *B60L 1/006* (2013.01); *B60L 3/0069* (2013.01); *B60L 3/04* (2013.01); *B60L 5/005* (2013.01);
(Continued)

(58) Field of Classification Search
CPC .......... B60L 1/006; B60L 5/005; B60L 11/18; B60L 11/1809; B60L 11/1811; B60L 11/1812; B60L 11/182; B60L 11/1829; B60L 11/1842; B60L 2210/30; B60L 2210/40; B60R 16/033; B60W 10/26;
(Continued)

(56) References Cited

U.S. PATENT DOCUMENTS 6,104,160 A      8/2000   Iwata et al. ................... 320/103
8,058,836 B2 *  11/2011  Ichikawa .............. B60L 11/123
                                                                        180/54.1
(Continued)

FOREIGN PATENT DOCUMENTS

EP    0 552 737 A1    7/1993
EP    0 788 212 A2    8/1997
(Continued)

OTHER PUBLICATIONS

Office Action dated Nov. 18, 2014 in corresponding Japanese Patent Application No. 2013-545984 (with English language translation)(6 pages).
(Continued)

*Primary Examiner* — Levi Gannon
(74) *Attorney, Agent, or Firm* — Ostrolenk Faber LLP

(57) ABSTRACT

An electric vehicle that is serving as a mobile power supply device is provided with: a power-supplying coil that is covered by a weatherproof cover and that, together with an external power-receiving coil, forms an electromagnetic coupling circuit; and a power supplying circuit that supplies power stored in a storage cell wirelessly to the outside via the electromagnetic coupling circuit that is formed by the power-supplying coil and the external power-receiving coil.

6 Claims, 8 Drawing Sheets

(51) Int. Cl.
*B60R 16/033* (2006.01)
*B60L 1/00* (2006.01)
*B60L 7/14* (2006.01)
*B60L 3/00* (2006.01)
*B60L 3/04* (2006.01)
*B60L 15/00* (2006.01)
*H02J 5/00* (2016.01)
*B60W 10/26* (2006.01)
*H02J 7/14* (2006.01)

(52) U.S. Cl.
CPC .............. *B60L 7/14* (2013.01); *B60L 11/18* (2013.01); *B60L 11/182* (2013.01); *B60L 11/1803* (2013.01); *B60L 11/1812* (2013.01); *B60L 11/1829* (2013.01); *B60L 11/1833* (2013.01); *B60L 11/1842* (2013.01); *B60L 11/1844* (2013.01); *B60L 11/1846* (2013.01); *B60L 15/007* (2013.01); *B60R 16/033* (2013.01); *B60W 10/26* (2013.01); *H02J 5/005* (2013.01); *B60L 2210/30* (2013.01); *B60L 2210/40* (2013.01); *B60L 2220/14* (2013.01); *B60L 2240/421* (2013.01); *H01M 2220/20* (2013.01); *H02J 7/14* (2013.01); *Y02E 60/721* (2013.01); *Y02T 10/645* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC .......... B60W 10/30; H02J 5/005; H02J 7/025; H02J 17/00; H02J 50/10; H02J 50/12; H04B 5/0037; H04B 5/0075; Y02E 60/721; Y02T 10/7005; Y02T 10/7072; Y02T 10/7241; Y02T 90/122; Y04S 10/126; Y04S 30/14
USPC ......................... 307/9.1, 10.1, 104
See application file for complete search history.

(56) References Cited

U.S. PATENT DOCUMENTS

| | | | | |
|---|---|---|---|---|
| 8,084,883 | B2* | 12/2011 | Komazawa | B60L 11/14 307/9.1 |
| 9,083,193 | B2* | 7/2015 | Obayashi | B60L 3/0046 |
| 2010/0164297 | A1* | 7/2010 | Kurs | H01Q 1/248 307/104 |
| 2012/0286726 | A1* | 11/2012 | Kim | B60L 11/182 320/108 |

FOREIGN PATENT DOCUMENTS

| | | |
|---|---|---|
| JP | 02-130961 | 10/1990 |
| JP | 05-239947 | 9/1993 |
| JP | 05-256038 | 10/1993 |
| JP | 08-019985 | 1/1996 |
| JP | 08-241386 | 9/1996 |
| JP | 2001-030979 | 2/2001 |
| JP | A-2002-084673 | 3/2002 |
| JP | A-2002-135906 | 5/2002 |
| JP | 2006-158084 | 6/2006 |
| JP | 2008-236916 | 10/2008 |
| JP | 2009-225551 | 10/2009 |
| JP | 2010-172068 | 8/2010 |
| JP | A-2010-246271 | 10/2010 |
| JP | 2011-055589 | 3/2011 |
| JP | 2011-062037 | 3/2011 |
| JP | 2011-097671 | 5/2011 |
| JP | A-2011-139566 | 7/2011 |
| JP | 2011-205830 | 10/2011 |
| JP | A-2011-204836 | 10/2011 |
| WO | WO 2010/036980 A1 | 4/2010 |
| WO | WO 2011/031169 A1 | 3/2011 |
| WO | WO 2011/117714 A2 | 9/2011 |

OTHER PUBLICATIONS

International Search Report and Written Opinion mailed Jan. 15, 2013 in corresponding PCT International Application No. PCT/JP2012/080502.

Search Report dated Dec. 15, 2015 issued in corresponding European Patent Application No. 12851287.8.

* cited by examiner

MOBILE POWER SUPPLY DEVICE

This application is a continuation application based on a PCT Patent Application No. PCT/JP2012/080502, filed Nov. 26, 2012, whose priority is claimed on Japanese Patent Application No. 2011-257944, filed Nov. 25, 2011. The contents of both the PCT application and the Japanese Patent Application are incorporated herein by reference.

TECHNICAL FIELD

The present invention relates to a mobile power supply device that is capable of supplying power externally of itself.

BACKGROUND ART

Conventionally, it is common for various vehicles such as automobiles and transporting vehicles to be equipped with a combustion engine as a power generating source. However, in recent years, in order to achieve the ideal of a low-carbon society, vehicles that are equipped with an electric motor instead of a combustion engine as a power generating source, or vehicles that are equipped with both a combustion engine and an electric motor as a power source are becoming increasingly common. Such vehicles are equipped with rechargeable batteries (for example, secondary cells such as lithium ion cells or nickel hydrogen cells or the like) that are rechargeable and that supply power to drive the electric motor, and are so constructed that the storage cells can be charged by power supplied from an external power supply device.

For example, in an electric vehicle (EV) that uses an electric motor exclusively as a power generating source, the charging of the storage cells is performed using power that is supplied from an external power supply device. Furthermore, among hybrid vehicles (HV) in which both a combustion engine and an electric motor combine to serve as a power generating source, in those hybrid vehicles that are known as plug-in hybrid vehicles, the charging of the storage cells can be performed using power supplied from an external power supply device in the same way as in an electric vehicle.

Vehicles such as the above-described electric vehicles and hybrid vehicles and the like are used as transportation means. Because of this, they are usually so constructed that the power to be supplied to the motor is charged to a storage cell using power that is supplied from the external power supply device. In contrast to this, in Patent documents 1 through 3 (see below), technology is disclosed that makes it possible to supply power from the storage cells that are installed in the electric vehicle to the outside (for example, to a house). Specifically, in the technology disclosed in these documents, an electric vehicle that has been parked adjacent to the house is connected to a house by a cable, and power is supplied to the house from the electric vehicle via this cable.

DOCUMENT OF RELATED ART

Patent Documents

[Patent document 1] Japanese Patent Application Laid-Open (JP-A) No. 2011-55589
[Patent document 2] Japanese Patent Application Laid-Open (JP-A) No. 2010-172068
[Patent document 3] Japanese Patent Application Laid-Open (JP-A) No. 2006-158084

SUMMARY OF INVENTION

Technical Problem

However, in the technology disclosed in the aforementioned Patent documents 1 through 3, in order to supply power from an electric vehicle to a house, it is necessary to connect the electric vehicle and the house together electrically by means of a cable. In order to make this connection, it is necessary for the cable plugs to be engaged with the sockets provided in the house and the electric vehicle. However, it is difficult for this engagement to be performed automatically without any human intervention, so that it is necessary for a user to perform this engagement manually.

Because the aforementioned plugs and sockets are provided either outside the vehicle or outside the house, it is easy for electrical connection faults such as poor connections or short-circuiting and the like to occur due to the ingress of rainwater or foreign objects (for example insects) and the like. Moreover, as is described above, because it is necessary for the cable to be connected manually by a user, in some cases this task must be performed in an unpleasant environment (for example, in a cold environment, or a hot environment, or a dark environment) either outside the vehicle or outside the house.

If the aforementioned task is only performed a few times, then the task is not overly arduous. However, in cases such as when, for example, a user has to perform the task at several dozen or more uninhabited houses while also having to supply power for illumination at each one, then the user must perform the aforementioned task each time they arrive at one of the houses on their round. Because of this, the task does become extremely burdensome.

The present invention was conceived in view of the above-described circumstances, and it is an object thereof to provide a mobile power supply device that makes it possible to easily supply power without causing any electrical connection faults to occur.

Solution to Problem

In order to solve the above-described problems, a mobile power supply device according to a first aspect of the present invention is a mobile power supply device (1 or 3) that is capable of supplying power stored in a storage cell (11) to the outside, and that includes: a power-supplying coil (15) that is covered by a weatherproof component (15a) and that, together with an external power-receiving coil (111), forms a first electromagnetic coupling circuit; and a power converter (16 or 31) that converts DC power stored in the storage cell into AC power and then supplies the AC power to the power-supplying coil.

Moreover, according to a mobile power supply device according to a second aspect of the present invention in the above-described first aspect, there are provided: a power-receiving coil (17) that, together with an external power-supplying coil (121), forms a second electromagnetic coupling circuit; a power-receiving circuit (18) that receives power that is supplied wirelessly from the outside via the second electromagnetic coupling circuit that is formed by the external power-supplying coil and the power-receiving coil; and a charging device (19) that charges the storage cell using power received by the power-receiving circuit.

Moreover, according to a mobile power supply device according to a third aspect of the present invention in the above-described second aspect, the power-receiving coil is covered by a weatherproof component.

Moreover, according to a mobile power supply device according to a fourth aspect of the present invention in the above-described second aspect, there are provided: a motor (14) that generates power used for movement; a drive circuit (13) that drives the motor using power stored in the storage cell; and a switching circuit (12) that switches between connecting the power-supplying circuit, the power-receiving circuit, and the drive circuit to the storage cell and disconnecting them from the storage cell.

Moreover, according to a mobile power supply device according to a fifth aspect of the present invention in the above-described second or third aspects, there are provided: a motor (14) that generates power used for movement; and a power supply destination setting device (32, 33, 35, and 36) that sets the destination for the supply of AC power output from the power converter (31) to either the power-supplying coil or the motor.

In order to solve the above-described problems, a mobile power supply device according to a sixth aspect of the present invention is a mobile power supply device (2) that is capable of supplying power stored in a storage cell (11) to the outside, and that includes: a power-transferring coil (21) that is covered by a weatherproof component (21a) and that, together with an external power-transferring coil, forms an electromagnetic coupling circuit; and a power-transferring circuit (22) that, out of a first operation in which power that is stored in the storage cell is supplied wirelessly to the outside via the electromagnetic coupling circuit, and a second operation in which power that is supplied wirelessly from the outside via the electromagnetic coupling circuit is received, performs at least the first operation.

Moreover, according to a mobile power supply device according to a seventh aspect of the present invention in the above-described sixth aspect, there is provided a charging device (19) that, when the second operation is performed by the power-transferring circuit, charges the storage cell using power received by the power-transferring circuit.

Moreover, according to a mobile power supply device according to an eighth aspect of the present invention in the above-described sixth or seventh aspects, there are provided: a motor (14) that generates power that is used for movement; a drive circuit (13) that drives the motor using power stored in the storage cell; and a switching circuit (12) that switches between connecting the power-transferring circuit and the drive circuit to the storage cell, and disconnecting them from the storage cell.

Effects of the Invention

According to the present invention, when a first electromagnetic coupling circuit is formed by a power-supplying coil that is covered by a weatherproof component and by an external power-receiving coil, then the power accumulated in a storage cell is supplied to the outside wirelessly via this first electromagnetic coupling circuit. Because of this, the effect is obtained that it is possible to easily supply power without having to perform the task of connecting a cable. Moreover, because the power-supplying coil is covered by a weatherproof component, no electrical connection faults occur. As a result, the effect is obtained that maintenance is easy.

DESCRIPTION OF EMBODIMENTS

Hereinafter, a mobile power supply device according to embodiments of the present invention will be described with reference made to the drawings. Note that, hereinafter, an example of a case in which the mobile electric supply device is an electric vehicle that uses only a motor as a power generating source will be described.

First Embodiment

Figure 1:
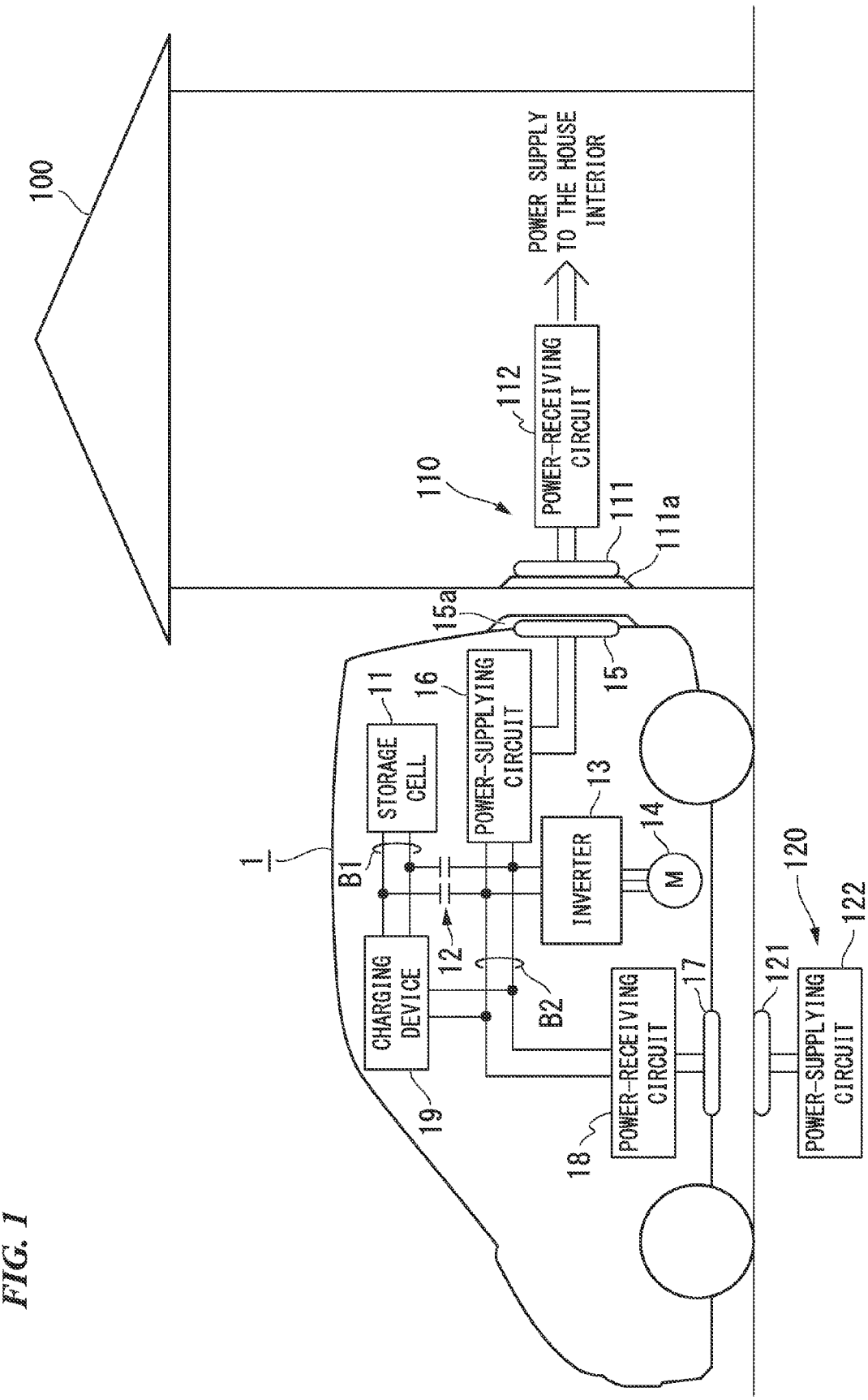
FIG. 1 is a block diagram showing the structure of principal portions of an electric vehicle that is serving as a mobile power supply device according to a first embodiment of the present invention.

FIG. 1 is a block diagram showing the structure of principal portions of an electric vehicle that is serving as a mobile power supply device according to a first embodiment of the present invention. As is shown in FIG. 1, while being parked adjacent to a house 100, an electric vehicle 1 is able to supply power to a power-receiving device 110 that is provided in that house 100, and is also able to charge a storage cell 11 with power that is supplied from a power-supplying device 120 that is installed on the ground at a distance of approximately 1 to 2 m from the house 100.

The electric vehicle 1 is provided with a storage cell 11, a contactor 12 (i.e., a switching circuit), an inverter 13 (i.e., a drive circuit), a motor 14, a power-supplying coil 15, a power-supplying circuit 16 (i.e., a power converter), a power-receiving coil 17, a power-receiving circuit 18, and a charging device 19. The storage cell 11 and the charging device 19 are connected to a DC bus B1, and the inverter 13, the power supply circuit 16, the power-receiving circuit 18, and the charging device 19 are connected to a DC bus B2.

The storage cell 11 is a cell that is mounted in the electric vehicle 1 and that is capable of being recharged (for example, a secondary cell such as a lithium-ion cell or a nickel hydrogen cell), and supplies power that is used to drive the motor 14. The contactor 12 is provided between the DC bus B1 and the DC bus B2 and, under the control of a control device (not shown) that is provided in the electric vehicle 1, switches the DC bus B1 and the DC bus B2 between a state in which they are connected together and a state in which they are disconnected from each other.

Specifically, when power is discharged from the storage cell 11, the contactor 12 is controlled so that the DC bus B1 and the DC bus B2 are connected together so that, as a result of this, the storage cell 11, the inverter 13, the power supply circuit 16, and the power-receiving circuit 18 are connected. In contrast to this, when the storage cell 11 is charged, the contactor 12 is controlled so that the DC bus B1 and the DC bus B2 are disconnected from each other so that, as a result of this, the storage cell 11, the inverter 13, the power supply circuit 16, and the power-receiving circuit 18 are disconnected.

The inverter 13 drives the motor 14 under the control of a control device (not shown) using power that is supplied via the contactor 12 from the storage cell 11. The motor 14 is mounted in the electric vehicle 1 so as to serve as a power generating source that generates motive power that is used to enable the electric vehicle 1 to move, and generates this motive power in accordance with the driving of the inverter 13. A motor such as permanent magnet synchronous motor, an induction motor and the like can be used as the motor 14. Moreover, it is also possible for the inverter 13 to convert regenerative power generated in the motor 14 into DC power, and then to charge the storage cell 11 using this DC power. Namely, the inverter 13 may also be a bi-directional power converter.

The power-supplying coil 15 is provided in a rear portion of the electric vehicle 1, and is a coil that is used to wirelessly supply power from the storage cell 11 to the power-receiving device 110 that is provided in the house 100. An electromagnetic coupling circuit (i.e., a first electromagnetic coupling circuit) is formed by placing the power-supplying coil 15 adjacent to a power-receiving coil 111 that is provided in the power-receiving device 110. This electromagnetic coupling circuit refers to a circuit that supplies power wirelessly from the power-supplying coil 15 to the power-receiving coil 111 by electromagnetically coupling together the power-supplying coil 15 and the power-receiving coil 111. This electromagnetic coupling circuit may be either a circuit that supplies power by means of electromagnetic induction, or a circuit that supplies power by means of electromagnetic field resonance.

The power-supplying coil 15 is provided in the rear portion of the electric vehicle 1 and is completely covered by a weatherproof cover 15a (i.e., a weatherproof component). The weatherproof cover 15a may be a cover that is provided in order to prevent the ingress of rainwater or foreign objects (for example insects) and the like into the power-supplying coil 15, or may be a cover that physically protects the power-supplying coil 15, and is formed from a resin that contains a high polymer material (for example, plastic, engineering plastic, or FRP (Fiber Reinforced Plastic)) that does not obstruct the wireless supply of power. Alternatively, the weatherproof cover 15a may be formed from a ceramic material that does not obstruct the wireless supply of power (for example, alumina, mullite, ferrite, forsterite, zirconia, zircon, cordierite, aluminum nitride, silicon nitride, silicon carbide, lead zirconate titanate, and conjugated compounds of these), and compounds of these with resins containing a high polymer material. Alternatively, in order to physically protect the power-supplying coil 15, these weatherproof covers 15a may be covered by a rubbery elastic body, or may be covered by a rubbery elastic body that is filled with a gas such as air or nitrogen.

The power supply circuit 16 supplies power wirelessly from the storage cell 11 to the power-receiving device 110 via the electromagnetic coupling circuit that is formed by the power-supplying coil 15 and the power-receiving coil 111. Specifically, the power supply circuit 16 converts power (i.e., DC power) that is supplied from the storage cell 11 via the contactor 12 into AC power, and then supplies this to the power-supplying coil 15. As a result of this, the wireless supply of power to the power-receiving device 110 is achieved.

The power-receiving coil 17 is provided in an underside portion of the electric vehicle 1, and is a coil that is used to wirelessly receive power (i.e., AC power) that is supplied from a power-supplying coil 121 that is provided in the power-supplying device 120 that is installed on the ground at a distance of approximately 1 to 2 meters from the house 100. An electromagnetic coupling circuit (i.e., a second electromagnetic coupling circuit) is formed by placing the power-receiving coil 17 adjacent to the power-supplying coil 121 of the power-supplying device 120.

This electromagnetic coupling circuit refers to a circuit that supplies power wirelessly from the power-supplying coil 121 to the power-receiving coil 17 by electromagnetically coupling together the power-supplying coil 121 and the power-receiving coil 17. This electromagnetic coupling circuit may be either a circuit that supplies power by means of electromagnetic induction, or a circuit that supplies power by means of electromagnetic field resonance. Note that in FIG. 1, a state is shown in which the power-receiving coil 17 is provided in the underside portion of the electric vehicle 1 in an uncovered state, however, it is also possible to provide the same type of cover as the weatherproof cover 15a that covers the power-supplying coil 15 so that the power-receiving coil 17 is completely covered. In particular, a cover that contains a high-strength alumina ($Al_2O_3$) is preferred as there are cases in which the underside of the electric vehicle may be damaged while the vehicle is traveling by coming into contact with objects on the road, or by colliding with objects bouncing up from the road surface.

Furthermore, in order to physically protect the power-receiving coil 17, these weather resistant covers 15a may be covered by a rubbery elastic body, or may be covered by a rubbery elastic body that is filled with a gas such as air or nitrogen.

The power-receiving coil 18 receives power (i.e., AC power) that is supplied wirelessly via the electromagnetic coupling circuit that is formed by the power-supplying coil 121 of the power-supplying device 120 and by the power-receiving coil 17. It then converts the received power into DC power and then supplies it to the DC bus B2. The charging device 19 is a device that charges the storage cell 11 using power (i.e., DC power) that is supplied to it via the DC bus B2 from the power-receiving circuit 18.

Next, a brief description of the power-receiving device 110 that is provided in the house 100, and of the power-supplying device 120 that is installed on the ground at a distance of approximately 1 to 2 meters from the house 100 will be given. The power-receiving device 110 is provided with the power-receiving coil 111 that, together with the power-supplying coil 15 of the electric vehicle 1, forms an electromagnetic coupling circuit, and with a power-receiving circuit 112. The power-receiving coil 111 is attached to a wall surface of the house 100 at a height that is substantially the same as the height of the power-supplying coil 15, and it is completely covered by a weatherproof cover 111a of the same type as the weatherproof cover 15a.

The power-receiving circuit 112 receives power (i.e., AC power) wirelessly via the electromagnetic coupling circuit that is formed by the power-supplying coil 15 of the electric vehicle 1 and by the power-receiving coil 111. The power-receiving circuit 112 then converts the received power into DC power and supplies it to the interior of the house 100.

The power-supplying device 120 is provided with the power-supplying coil 121 that, together with the power-receiving coil 17 of the electric vehicle 1, forms an electromagnetic coupling circuit, and with the power-supplying circuit 122. The power-supplying coil 121 is located in a position where it is adjacent to the power-receiving coil 17 of the electric vehicle 1 when the electric vehicle 1 has been parked next to the house 100 so that the power-supplying coil 15 and the power-receiving coil 111 of the power-receiving device 110 are adjacent to each other. Note that in the same way as the power-receiving coil 17 of the electric vehicle 1, it is also possible for the power-supplying coil 121 to be completely covered by a cover of the same type as the weatherproof cover 15a. The power-supplying circuit 122 wirelessly supplies AC power to the electric vehicle 1 via the electromagnetic coupling circuit that is formed by the power-supplying coil 121 and the power-receiving coil 17.

Figure 2A:
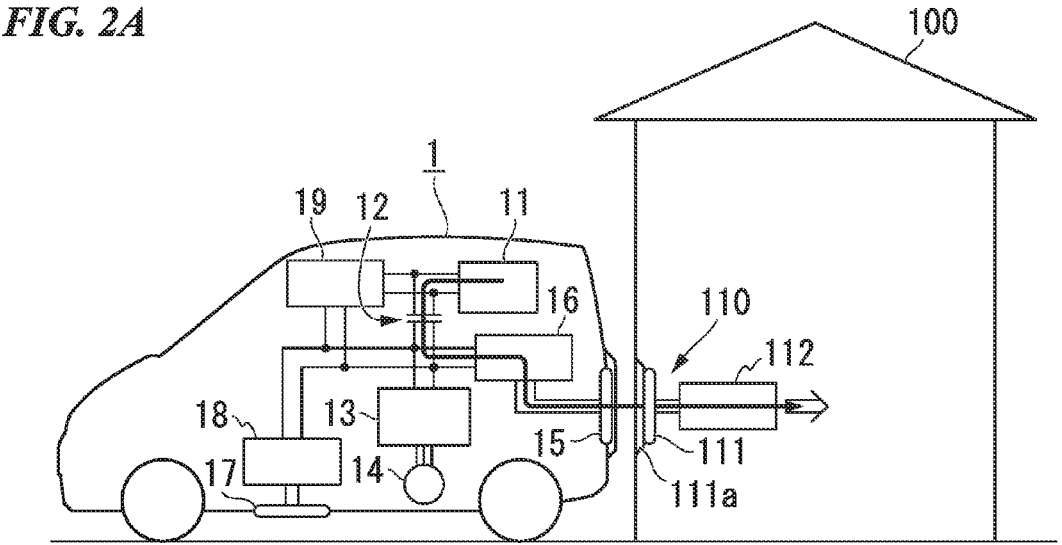
FIG. 2A is a view illustrating an operation of the first embodiment of the present invention.
Figure 2B:
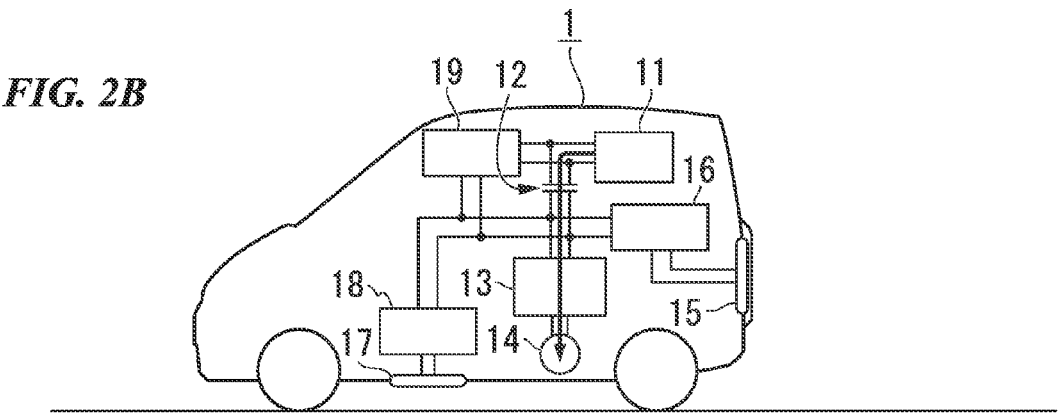
FIG. 2B is a view illustrating an operation of the first embodiment of the present invention.
Figure 2C:
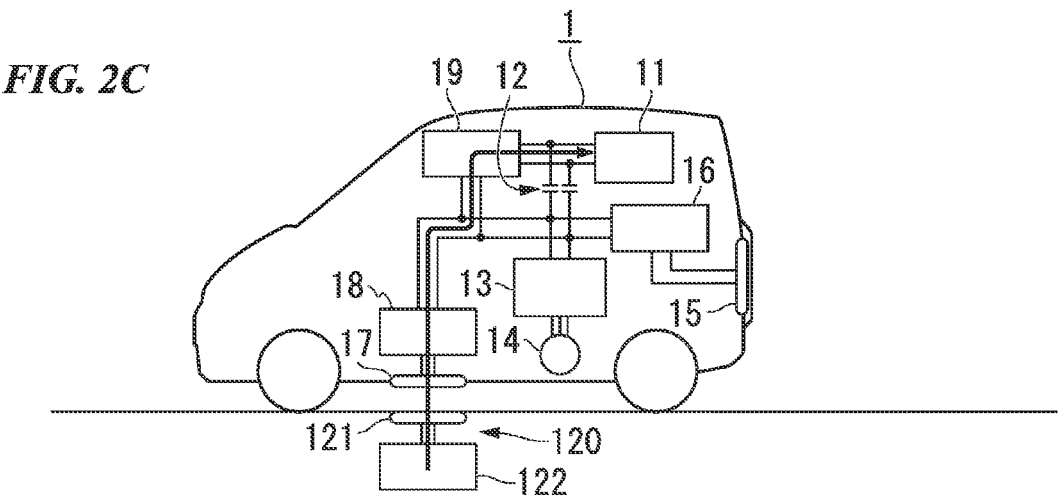
FIG. 2C is a view illustrating an operation of the first embodiment of the present invention.

Next, operations of the electric vehicle 1 having the above-described structure will be described. FIGS. 2A through 2C are views illustrating operations according to the first embodiment of the present invention. FIG. 2A illustrates an operation performed when power is supplied to the house 100, FIG. 2B illustrates an operation performed when the vehicle is traveling, and FIG. 2C illustrates an operation performed when the storage cell 11 is being charged. Hereinafter, each of these operations will be described in sequence.

[Operation Performed when Power is Supplied to the House 100]

Firstly, a user drives the electric vehicle 1 backwards so that the rear portion of the electric vehicle 1 will be adjacent to the house 100 to which power is to be supplied. The user moves the electric vehicle 1 backwards, adjusting the position in the left right direction thereof so that the power-supplying coil 15 of the electric vehicle 1 will face the power-receiving coil 111 of the power-receiving device 110 that is provided in the house 100. Once the electric vehicle 1 has been moved backwards to a position where power is able to be supplied to the house 100, the electric vehicle 1 is stopped. As a result of this, as is shown in FIG. 2A, an electromagnetic coupling circuit is formed by the power-supplying coil 15 of the electric vehicle 1 and by the power-receiving coil 111.

Next, when the user issues a power supply command to the electric vehicle 1 while the electric vehicle 1 is stopped, the supply of power to the house 100 is started. Specifically, when the user issues a power supply command, the control device (not shown) provided in the electric vehicle 1 controls the contactor 12 so that the DC bus B1 and the DC bus B2 are connected together, and then causes the power-supplying circuit 16 to operate. At this time, the control device (not shown) stops the operations of the inverter 13, the power-receiving circuit 18, and the charging device 19.

As a result of this, as is shown in FIG. 2A, power stored in the storage cell 11 (i.e., DC power) is supplied to the power-supplying circuit 16 via the contactor 12, and is converted into AC power. This converted AC power is then supplied to the power-supplying coil 15, and is then supplied wirelessly to the power-receiving device 110 via the electromagnetic coupling circuit that is formed by the power-supplying coil 15 and the power-receiving coil 111. The AC power supplied to the power-receiving device 110 is converted into DC power by the power-receiving circuit 112, and this converted DC power is then supplied to the interior of the house 100.

[Operation Performed During Traveling]

When the user starts driving the electric vehicle 1, the control device (not shown) provided in the electric vehicle 1 controls the contactor 12 so that the DC bus B1 and the DC bus B2 are connected together, and causes the inverter 13 to operate. At this time, the control device (not shown) stops the operations of the power-supplying circuit 16, the power-receiving circuit 18, and the charging device 19. As a result of this, as is shown in FIG. 2B, the power (i.e., DC power) stored in the storage cell 11 is supplied to the inverter 13 via the contactor 12. As a result of the motor 14 then being driven by the inverter 13, the electric vehicle 1 starts to travel.

[Operation Performed when the Storage Cell 11 is being Charged]

In the same way as the above-described operation performed when power is supplied to the house 100, the user drives the electric vehicle 1 backwards so that the rear portion of the electric vehicle 1 will be adjacent to the house 100 to which power is to be supplied. Once the electric vehicle 1 has been moved backwards to a position where power is able to be supplied to the house 100, the electric vehicle 1 is stopped. As a result of this, as is shown in FIG. 2C, an electromagnetic coupling circuit is formed by the power-receiving coil 17 of the electric vehicle 1 and by the power-supplying coil 121 provided in the power-supplying device 120.

Next, when the user issues a charging command to the electric vehicle 1 while the electric vehicle 1 is stopped, the charging of the storage cell 11 is started. Specifically, when the user issues a charging command, the control device (not shown) provided in the electric vehicle 1 controls the contactor 12 so that the DC bus B1 and the DC bus B2 are disconnected from each other, and then causes the power-receiving circuit 18 and the charging device 19 to operate. At this time, the control device (not shown) stops the operations of the inverter 13 and the power-supplying circuit 16.

As a result of this, as is shown in FIG. 2C, the AC power that is supplied from the power-supply circuit 122 of the power-supplying device 120 is supplied wirelessly to the electric vehicle 1 via the electromagnetic coupling circuit that is formed by the power-supplying coil 121 and the power-receiving coil 17. The AC power supplied to the electric vehicle 1 is received by the power-receiving circuit 18 and is converted into DC power. This converted DC power is then supplied to the charging device 19 and, as a result of this, the charging of the storage cell 11 takes place.

As a result of the above, in the present embodiment, the electric vehicle 1 is moved adjacent to the house 100 so that the power-supplying coil 15 of the electric vehicle 1 faces the power-receiving coil 111 of the power-receiving device 110 that is provided in the house 100. Power can be supplied to the house 100 as a result of this operation alone being performed. As a consequence, power can be supplied easily even if the user does not perform the task of fitting the plug of a cable either outside the vehicle or outside the house into a socket provided in the electric vehicle or in the house, as is the case in the conventional technology. Moreover, the power-supplying coil 15 of the electric vehicle 1 and the power-receiving coil 111 of the power-receiving device 110 that is provided in the house 100 are completely covered respectively by the weatherproof covers 15a and 111a. Because of this, it is possible to prevent the ingress of rainwater or foreign objects (for example, insects) and the like into the power-supplying coil 15 and the power-receiving coil 111. As a result of this, because electrical connection faults do not occur, the task of maintenance can be performed easily.

If there are a plurality of houses 100, then there may be houses 100 that are either only able to receive a supply of power, or only able to supply power for charging a storage cell. In other words, there may be houses 100 that are not provided with the power-supplying device 120 which includes the power-supplying coil 121, and that are only capable of supplying power from the electric vehicle 1 to the house 100 and not of charging the storage cell 11 of the electric vehicle 1. There may also be houses 100 that are not provided with the power-receiving device 110 which includes the power-receiving coil 111, and that are only capable of charging the storage cell 11 of the electric vehicle 1 and not of supplying power from the electric vehicle 1 to the house 100.

Second Embodiment

Figure 3:
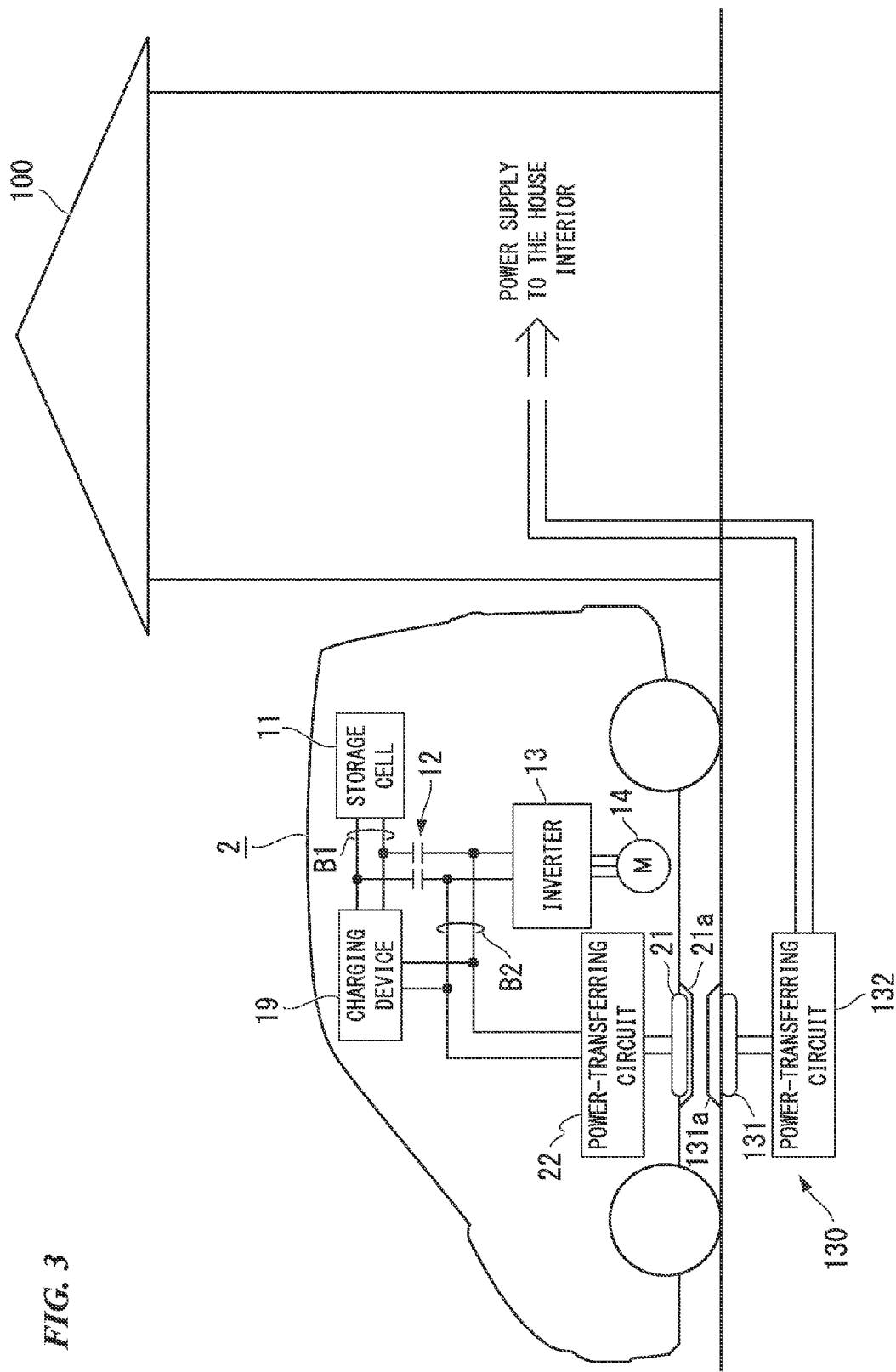
FIG. 3 is a block diagram showing the structure of principal portions of an electric vehicle that is serving as a mobile power supply device according to a second embodiment of the present invention.

FIG. 3 is a block diagram showing the structure of principal portions of an electric vehicle that is serving as a mobile power supply device according to a second embodiment of the present invention. The electric vehicle 1 described in the first embodiment supplies power to the house 100 and charges the storage cell 11 using mutually separate branches of circuit (i.e., a branch through the power-supplying coil 15 and the other through the power-receiving coil 17). However, in an electric vehicle 2 of the present embodiment, these operations are performed by one and the same branch of circuit.

Note that because the electric vehicle 2 supplies power to the house 100 and charges the storage cell 11 using one and the same branch of circuit, the structure on the house 100 side is different from that of the first embodiment. Namely, the power-receiving device 110 that is provided in the house 100 is omitted, and a power-transferring device 130 is provided instead of the power-supplying device 120. The power-transferring device 130 is described below.

As is shown in FIG. 3, the electric vehicle 2 is so constructed that the power-supplying coil 15 and the power-supplying circuit 16 of the electric vehicle 1 shown in FIG. 1 are omitted, and a power-transferring coil 21 and a power-transferring circuit 22 are provided respectively instead of the power-receiving coil 17 and the power-receiving circuit 18. Moreover, the weatherproof cover 15a that is provided in the electric vehicle 1 is omitted, and a weatherproof cover 21a (i.e., a weatherproof component) that covers the power-transferring coil 21 is provided.

The power-transferring coil 21 is provided in an underside portion of the electric vehicle 2, and is used to transmit or receive power (i.e., AC power) wirelessly between itself and a power-transferring coil 131 that is provided in the power-transferring device 130 that is installed on the ground. The power-transferring coil 21 is provided in the underside portion of the electric vehicle 2 so as to be completely covered by the weatherproof cover 21a which is similar to the above-described weatherproof cover 15a. An electromagnetic coupling circuit is formed when the power-transferring coil 21 is positioned adjacent to the power-transferring coil 131 of the power-transferring device 130.

The power-transferring circuit 22 supplies power from the storage cell 11 wirelessly to the power-transferring device 130 via the electromagnetic coupling circuit that is formed by the power-transferring coils 21 and 131. Moreover, the power-transferring circuit 22 also receives power that is supplied wirelessly from the power-transferring device 130 via the above-described electromagnetic coupling circuit. Specifically, the power-transferring circuit 22 converts power (i.e., DC power) that is supplied from the storage cell 11 via the contactor 12 into AC power, and then supplies it to the power-transferring coil 21. As a result of this, power can be supplied wirelessly to the power-transferring device 130. Moreover, the power-transferring circuit 22 also receives power (i.e., AC power) that is supplied to it from the power-transferring device 130, and converts this received power into DC power which it then supplies to the DC bus B2.

Next, a brief description of the power-transferring device 130 will be given. The power-transferring device 130 is provided with a power-transferring coil 131 that, together with the power-transferring coil 21 of the electric vehicle 2, forms an electromagnetic coupling circuit, and with a power-transferring circuit 132. The power-transferring device 130 supplies power that it has received wirelessly from the electric vehicle 2 to the house 100, and also supplies power wirelessly to the electric vehicle 2.

The power-transferring coil 131 is placed in the same position as the power-supplying coil 121 shown in FIG. 1 and is completely covered by the weatherproof cover 131a, which is the same type as the weatherproof cover 15a. The power-transferring circuit 132 supplies AC power wirelessly to the electric vehicle 2 via the electromagnetic coupling circuit that is formed by the power-transferring coils 21 and 131. In addition, the power-transferring circuit 132 receives the power that is supplied wirelessly from the electric vehicle 2 via the above-described electromagnetic coupling circuit.

Figure 4A:
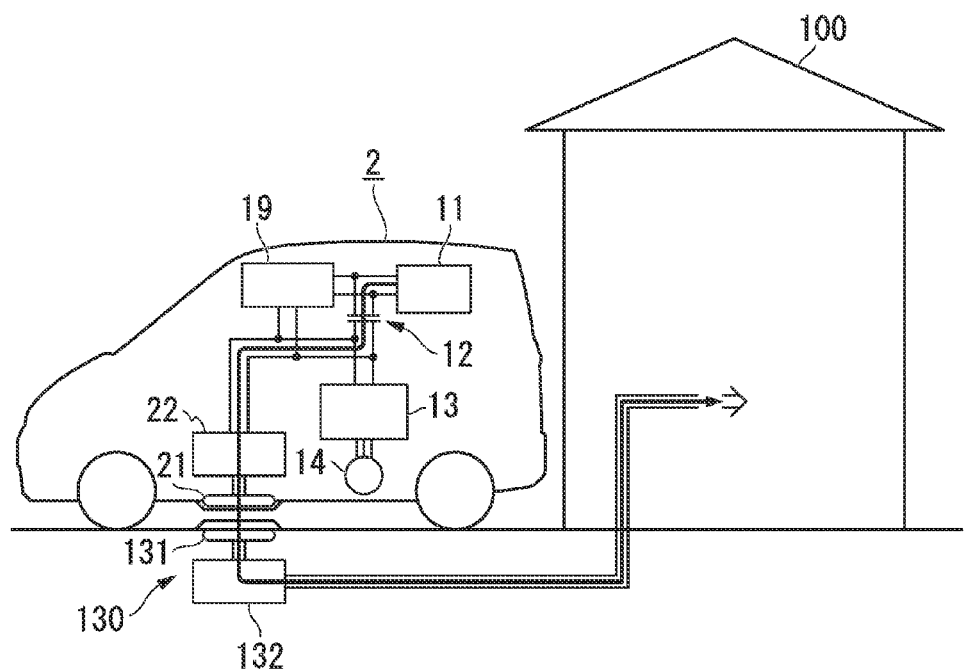
FIG. 4A is a view illustrating an operation of the second embodiment of the present invention.
Figure 4B:
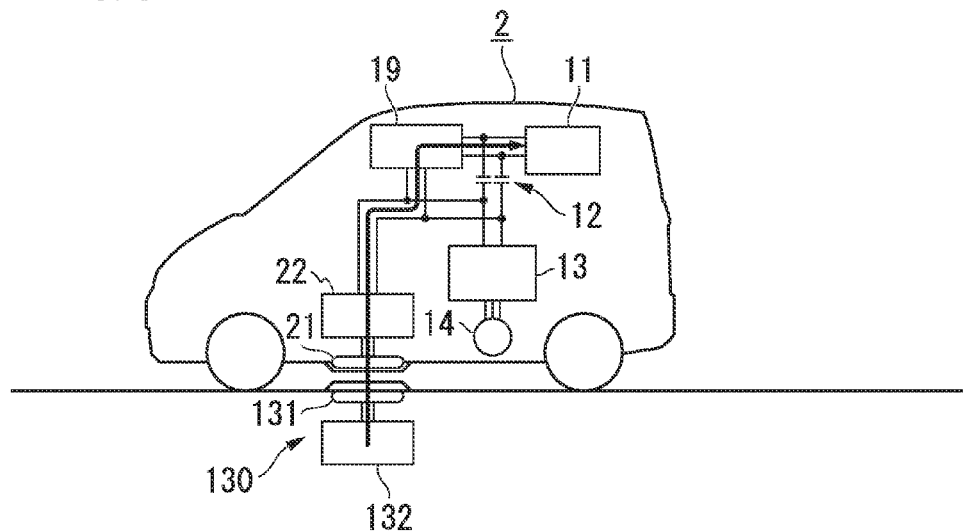
FIG. 4B is a view illustrating an operation of the second embodiment of the present invention.

Next operations of the electric vehicle 2 having the above-described structure will be described. FIGS. 4A and 4B are views illustrating operations according to the second embodiment of the present invention. FIG. 4A illustrates an operation performed when power is supplied to the house 100, FIG. 4B illustrates an operation performed when the storage cell 11 is being charged. Hereinafter, each of these operations will be described in sequence.

[Operation Performed when Power is Supplied to the House 100]

Firstly, in the same way as in the first embodiment, a user drives the electric vehicle 2 backwards so that the rear portion of the electric vehicle 2 will be adjacent to the house 100 to which power is to be supplied. Once the electric vehicle 2 has been moved backwards to a position where power is able to be supplied to the house 100, the electric vehicle 2 is stopped. Note that in the first embodiment, it was necessary to adjust the left-right position of the electric vehicle 1 so that the power-supplying coil 15 and the power-receiving coil 111 of the power-receiving device 110 that was provided in the house 100 would face each other. However, in the present embodiment, the left-right position of the electric vehicle 2 is adjusted so that the power-transferring coils 21 and 131 will face each other. As a result of this, as is shown in FIG. 4A, an electromagnetic coupling circuit is formed by the power-transferring coils 21 and 131.

Next, when the user issues a power supply command to the electric vehicle 2 while the electric vehicle 2 is stopped, the supply of power to the house 100 is started. Specifically, when a power supply command is issued by the user, the control device (not shown) provided in the electric vehicle 2 controls the contactor 12 so that the DC bus B1 and the DC bus B2 are connected together. The control device also operates the power-transferring circuit 22 so as to cause it to discharge power from the storage cell 11. At this time, the control device (not shown) stops the operations of the inverter 13 and the charging device 19.

As a result of this, as is shown in FIG. 4A, power stored in the storage cell 11 (i.e., DC power) is supplied to the power-transferring circuit 22 via the contactor 12, and is converted into AC power. This converted AC power is then supplied to the power-transferring coil 21, and is then supplied wirelessly to the power-transferring device 130 via the electromagnetic coupling circuit that is formed by the power-transferring coils 21 and 131. The AC power supplied to the power-transferring device 130 is converted into DC power by the power-transferring circuit 132, and this converted DC power is then supplied to the interior of the house 100.

[Operation Performed when the Storage Cell 11 is being Charged]

In the same way as the above-described operation performed when power is supplied to the house 100, the user drives the electric vehicle 2 backwards so that the rear portion of the electric vehicle 2 will be adjacent to the house 100 to which power is to be supplied. Once the electric vehicle 2 has been moved backwards to a position where power is able to be supplied to the house 100, the electric vehicle 2 is stopped. As a result of this, as is shown in FIG. 4B, an electromagnetic coupling circuit is formed by the power-transferring coils 21 and 131.

Next, when the user issues a charging command to the electric vehicle 2 while the electric vehicle 2 is stopped, the charging of the storage cell 11 is started. Specifically, when a charging command is issued by the user, the control device (not shown) provided in the electric vehicle 2 controls the contactor 12 so that the DC bus B1 and the DC bus B2 are disconnected from each other, and then causes the power-transferring circuit 22 to operate so that it receives power supplied from the outside. At this time, the control device (not shown) stops the operations of the inverter 13 and causes the charging device 19 to operate.

As a result of this, as is shown in FIG. 4B, the AC power that is supplied from the power-transferring circuit 132 of the power-transferring device 130 is supplied wirelessly to the electric vehicle 2 via the electromagnetic coupling circuit that is formed by the power-transferring coils 21 and 131. The AC power supplied to the electric vehicle 2 is received by the power-transferring circuit 22 and is converted into DC power. This converted DC power is then supplied to the charging device 19 and, as a result of this, the charging of the storage cell 11 takes place.

[Operation Performed During Traveling]

Although omitted from the drawings, in the same way as the operation that is performed during traveling of the first embodiment, when the user starts driving the electric vehicle 2, the control device (not shown) provided in the electric vehicle 2 controls the contactor 12 so that the DC bus B1 and the DC bus B2 are connected together, and causes the inverter 13 to operate. At this time, the control device (not shown) stops the operations of the power-transferring circuit 22 and the charging device 19. As a result of this, the power (i.e., DC power) stored in the storage cell 11 is supplied to the inverter 13 via the contactor 12, and the electric vehicle 2 starts to travel as a result of the motor 14 then being driven by the inverter 13.

As a result of the above, in the present embodiment, simply by moving the electric vehicle 2 adjacent to the house 100 so that the power-transferring coil 21 of the electric vehicle 2 faces the power-transferring coil 131 of the power-transferring device 130, power can be supplied to the house 100. As a consequence, in the present embodiment as well, power can be supplied easily even if the user does not perform any work either outside the vehicle or outside the house. Moreover, the power-transferring coil 21 of the electric vehicle 2 and the power-transferring coil 131 of the power-transferring device 130 are completely covered respectively by the weatherproof covers 21a and 131a. Because of this, it is possible to prevent the ingress of rainwater or foreign objects (for example, insects) and the like into the power-transferring coil 21 and the power-transferring coil 131. As a result of this, because electrical connection faults do not occur, the task of maintenance can be performed easily.

Third Embodiment

Figure 5:
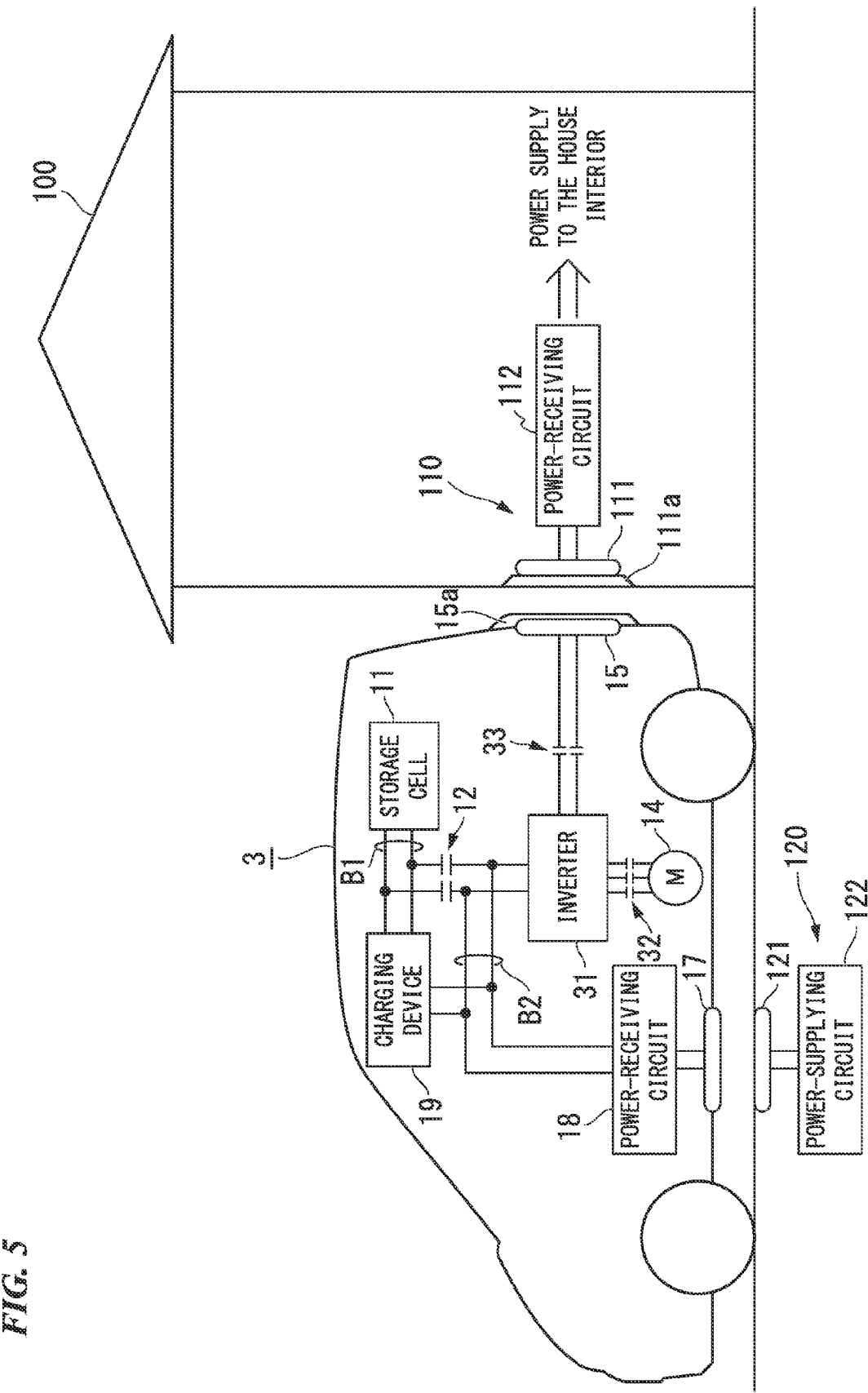
FIG. 5 is a block diagram showing a general outline of an electric vehicle that is serving as a mobile power supply device according to a third embodiment of the present invention.

FIG. 5 is a block diagram showing the structure of principal portions of an electric vehicle that is serving as a mobile power supply device according to a third embodiment of the present invention. The electric vehicle 1 according to the above-described first embodiment supplies power to the motor 14 and supplies power to the power-supplying coil 15 using mutually separate circuits, namely, the inverter 13 and the power-supplying circuit 16. However, an electric vehicle 3 of the present embodiment uses an inverter 31 to supply power to both the motor 14 and the power-supplying coil 15.

As is shown in FIG. 5, the electric vehicle 3 is so constructed that an inverter 31 (i.e., a power converter) is provided instead of the inverter 13 and the power-supplying circuit 16 of the electric vehicle 1 shown in FIG. 1, and a first contactor 32 and a second contactor 33 are provided.

The inverter 31 converts the power (i.e., DC power) supplied from the storage cell 11 into three-phase or two-phase AC power based on gate signals that are input from a gate drive circuit 35 (described below referring to FIG. 6). When the electric vehicle 3 is travelling (i.e., when the inverter 31 is connected to the motor 14 by the first contactor 32), this three-phase AC power (i.e., U phase, V phase, and W phase AC power) is then supplied to the motor 14. When the power is instead to be supplied to the house 100 (i.e., when the inverter 31 is connected to the power-supplying coil 15 by the second contactor 33), two-phase AC power (i.e., U phase and V phase AC power) is supplied to the power-supplying coil 15. Moreover, it is also possible for the inverter 31 to convert regenerative power generated in the motor 14 into DC power, and then to charge the storage cell 11 using this DC power. Namely, the inverter 31 may also be a bi-directional power converter.

The first contactor 32 is provided between the inverter 31 and the motor 14 and, under the control of a control unit 36 (described below referring to FIG. 6), switches the state of connection between the inverter 31 and the motor 14 between a connected state and a disconnected state. Specifically, when the electric vehicle 3 is traveling, the first contactor 32 changes to a closed state in order to connect the inverter 31 to the motor 14, and when the electric vehicle 3 is stopped, changes to an open state in order to disconnect the inverter 31 from the motor 14.

The second contactor 33 is provided between the inverter 31 and the power-supplying coil 15 and, under the control of the control unit 36 (described below referring to FIG. 6) switches the state of connection between the inverter 13 and the power-supplying coil 15 between a connected state and a disconnected state. Specifically, when power is being supplied to the house 100, the second contactor 33 changes to a closed state in order to connect the inverter 31 to the power-supplying coil 15, and when the supply of power to the house 100 is stopped, changes to an open state in order to disconnect the inverter 31 from the power-supplying coil 15.

Figure 6:
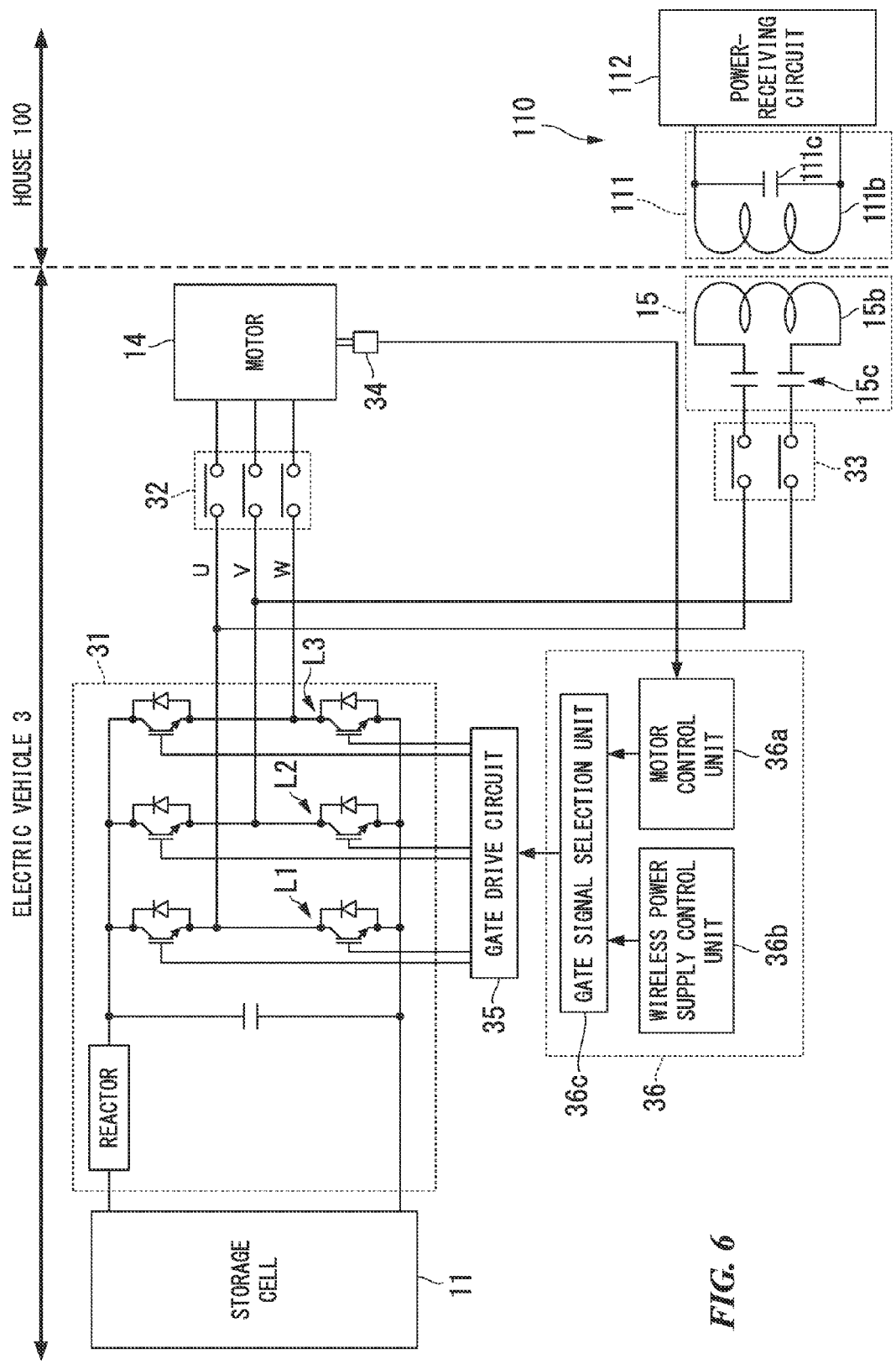
FIG. 6 is a view showing in detail a control system as well as components that are controlled by that control system according to the third embodiment of the present invention.

FIG. 6 is a view showing in detail a control system of the electric vehicle 3 and also the components that are controlled by this control system according to the third embodiment. Note that in FIG. 6, the same symbol is attached to a component that is the same as the component shown in FIG. 5. Moreover, in order to make the diagrams easier to view, the contactor 12 that is located between the storage cell 11 and the inverter 13 has been omitted from FIG. 6 through FIG. 8. As is shown in FIG. 6, the inverter 31 of the above-described electric vehicle 3 is realized by a circuit in which three switching legs L1, L2, and L3 that are used to output U-phase, V-phase, and W-phase AC power are connected together in parallel (i.e., by a circuit that is comprised of two transistors that are connected together in series, and a diode that is connected in parallel to each of these two transistors). Note that IGBT (Insulated Gate Bipolar Transistors) or power MOSFET (Metal-Oxide-Semiconductor Field-Effect Transistors) or the like can be used for the transistors.

Moreover, the inverter 31 is also provided with a smoothing circuit that is formed by a smoothing reactor and a smoothing capacitor and is located between the switching legs L1, L2, and L3 and the storage cell 11.

Moreover, as is shown in FIG. 6, the power-supplying coil 15 is provided with a coil 15b and two capacitors 15c. The capacitors 15c together with the coil 15b form a series resonant circuit. One end of the coil 15b is connected to the switching leg L1 via one of the capacitors 15c and the second contactor 33, while the other end of the coil 15b is connected to the switching leg L2 of the inverter 31 via the other capacitor 15c and the second contactor 33. Note that, although not shown in FIG. 6, the coil 15b is completely covered by the weatherproof cover 15a.

As is shown in FIG. 6, in addition to the above-described structure, the electric vehicle 3 is also provided with a rotation (i.e. angle) detector 34, a gate drive circuit 35, and a control unit 36. Note that the gate drive circuit 35, the control unit 36, the first contactor 32, and the second contactor 33 form the power supply destination setting device of the present embodiment.

The rotation detector 34 is a sensor that detects the rotation of the motor 14, and outputs a detection signal to the control unit 36. For example, the rotation detector 34 detects the rotation angle when the motor 14 is rotating using an encoder, and outputs to the control unit 36b a pulse signal which contains a predetermined number of pulses (for example, 65536 pulses) per one rotation of the rotor of the motor 14.

The gate drive circuit 35 is provided between the inverter 31 and the control unit 36, and converts the voltage of gate signals that are input from the control unit 36, and then outputs the result to the inverter 31. Moreover, because the gate drive circuit 35 is provided between the inverter 31 and the control unit 36, it also has the role of insulating the inverter 31 from the control unit 36.

The control unit 36 is comprised of a microcontroller or the like, and controls the inverter 31, the first contactor 32, and the second contactor 33 based on control programs that are stored in it. For example, when a travel command is input by an operation of the driver via an operating device (not shown), the control unit 36 controls the first contactor 32 so that the inverter 31 and the motor 14 are connected to each other. If, on the other hand, a power-supply command is input by the operation of the driver via the operating device, the control unit 36 controls the second contactor 33 so that the inverter 31 and the power-supplying coil 15 are connected to each other.

This control unit 36 is provided with three functional components, namely, a motor control unit 36a, a wireless power supply control unit 36b, and a gate signal selection unit 36c, that correspond to operations of the microcontroller to control the inverter 31.

When a travel command is input by an operation of the driver via an operating device (not shown), in order to create in the inverter 31 the three-phase AC power (i.e., U-phase, V-phase, and W-phase AC power) that is used to drive the motor 14 to rotate, the motor control unit 36a creates a gate signal that corresponds to the U-phase, V-phase, and W-phase AC power, and outputs this gate signal to the gate signal selection unit 36c at the same time as it monitors detection results from the rotation detector 34.

When a power supply command is input by an operation of the driver via the operating device, in order to create in the inverter 31 the two-phase AC power (i.e., U-phase and V-phase AC power) that is used to supply power to the power-supplying coil 15, the wireless power supply control unit 36b creates a gate signal that corresponds to the U-phase and V-phase AC power, and outputs this gate signal to the gate signal selection unit 36c. At this time, the wireless power supply control unit 36b keep the transistor of the switching leg L3 of the inverter 31 OFF without creating a gate signal that corresponds to the W-phase AC power.

The gate signal selection unit 36c selects either the gate signal input from the motor control unit 36a or the gate signal input from the wireless power supply control unit 36b, and outputs the selected gate signal to the gate drive circuit 35. Namely, if a travel command is input by an operation of the driver via an operating device, the gate signal selection unit 36c only outputs the gate signal from the motor control unit 36a to the gate drive circuit 35, and if a power supply command is input by an operation of the driver via the operating device, the gate signal selection unit 36c only outputs the gate signal from the wireless power supply control unit 36b to the gate drive circuit 35.

Moreover, as is shown in FIG. 6, the power-receiving coil 111 of the house 100 is provided with a coil 111b and the capacitors 111c. The capacitor 111c is connected in parallel between the coil 111b and the power-receiving circuit 112. Note that although not shown in FIG. 6, the coil 111b is completely covered by a weatherproof cover 111a.

Figure 7:
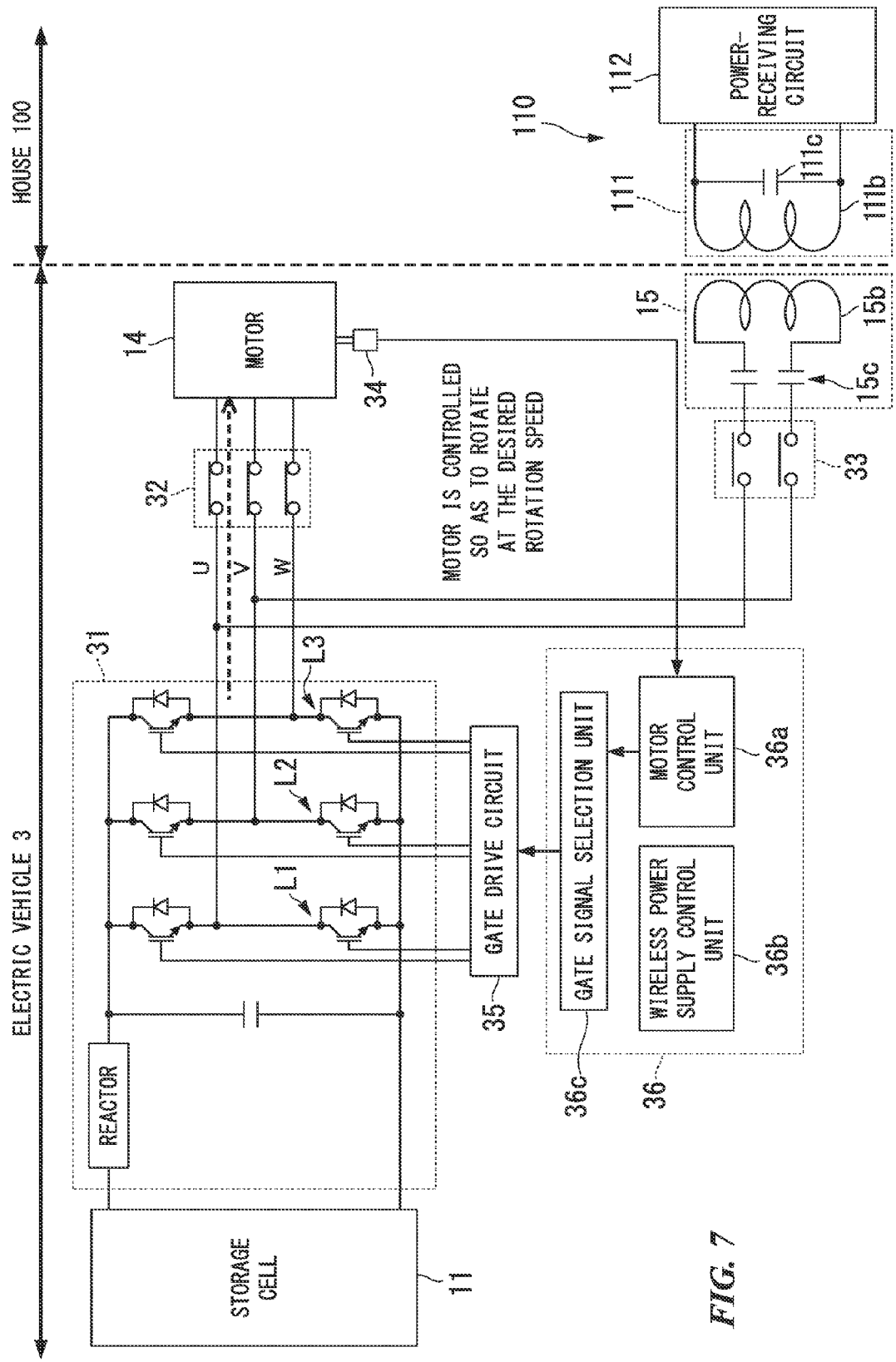
FIG. 7 is a view illustrating an operation of the third embodiment of the present invention.
Figure 8:
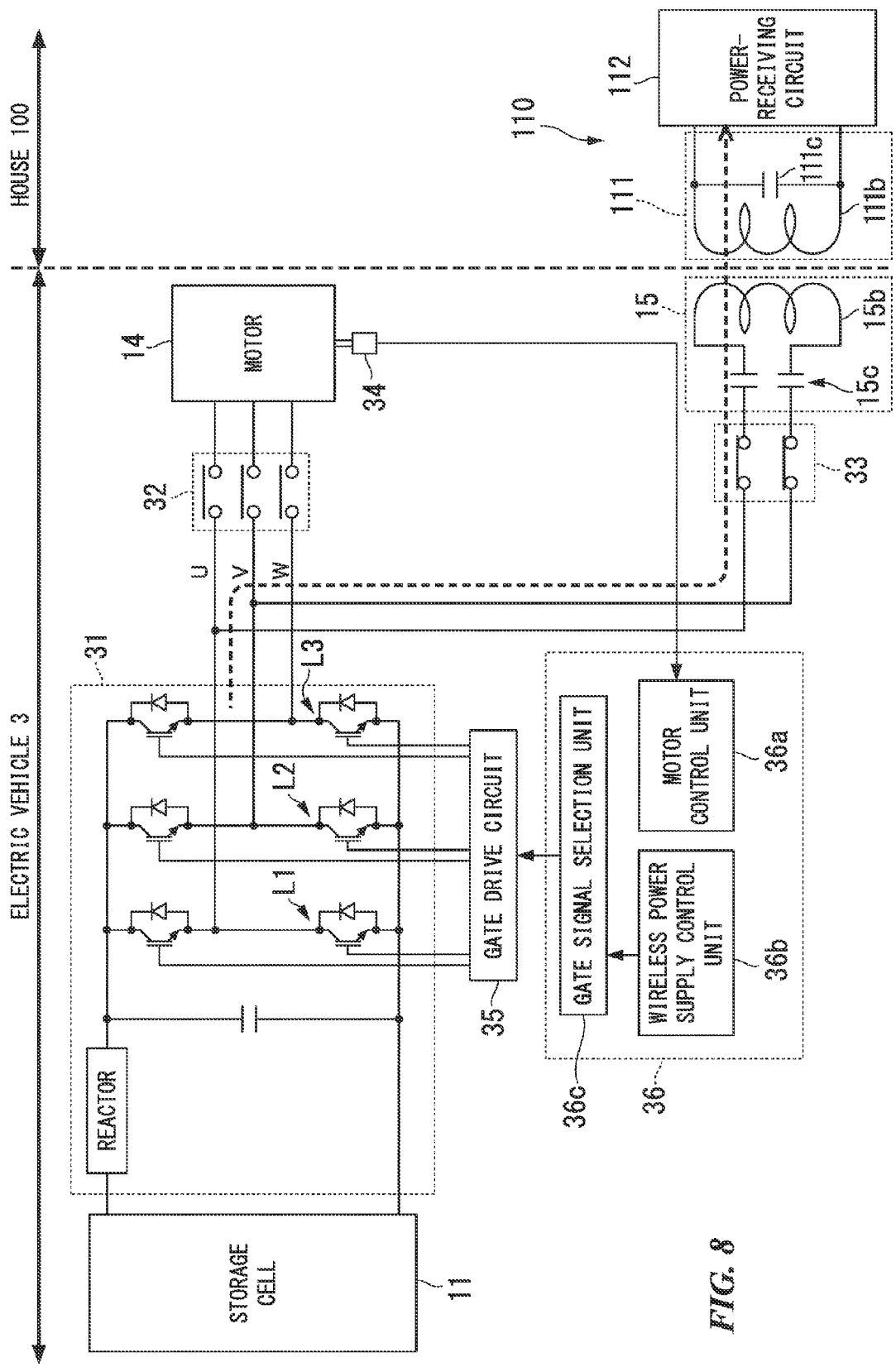
FIG. 8 is a view illustrating an operation of the third embodiment of the present invention.

Next, operations of the electric vehicle 3 having the above-described structure will be described. FIG. 7 and FIG. 8 are views illustrating operations of the third embodiment of the present invention. Note that FIG. 7 is a view illustrating an operation that is performed when electric vehicle 3 is traveling, while FIG. 8 is a view illustrating an operation that is performed when power is supplied to the house 100. Hereinafter, each of these operations will be described in sequence.

[Operation Performed During Traveling]

When a user starts driving the electric vehicle 3, the control unit 36 switches the first contactor 32 to a closed state so that the motor 14 and the inventor 31 are connected together, and also switches the second contactor 33 to an open state so that the power-supplying coil 15 and the inverter 31 are disconnected from each other. In addition, while monitoring the detection results made by the rotation detector 34, the motor control unit 36a of the control unit 36 creates in the inverter 31 the gate signal that is required to create the three-phase AC power (i.e., the U-phase, the V-phase, and the W-phase AC power) that is used to drive the motor 14 to rotate at the desired rotation speed, and then outputs this gate signal to the gate signal selection unit 36c.

Next, the gate signal selection unit 36c selects only the gate signal input from the motor control unit 36a, and outputs it to the gate drive circuit 35. The gate drive circuit 35 converts the voltage of the gate signal that was input from the gate signal selection unit 36c, and then outputs it to the inverter 31. The inverter 31 creates three-phase AC power (i.e., U-phase, V-phase, and W-phase AC power) from the power (i.e., the DC power) stored in the storage cell 11 based on the gate signal input from the gate drive circuit 35, and supplies the created three-phase AC power to the motor 14. As a result of the motor 14 being driven by the power supplied from the inverter 31, the electric vehicle 3 starts to travel.

[Operation Performed when Power is Supplied to the House 100]

Firstly, in the same way as in the first embodiment, a user drives the electric vehicle 3 so as to move the electric vehicle 3 backwards so that the rear portion of the electric vehicle 3 will be adjacent to the house 100 to which power is to be supplied. Once the electric vehicle 3 has been moved backwards to a position where power is able to be supplied to the house 100 having power-consuming equipment, the electric vehicle 3 is stopped. At this time, the user moves the electric vehicle 3 backwards while at the same time adjusting the position in the left right direction thereof so that the power-supplying coil 15 of the electric vehicle 3 will face the power-receiving coil 111 of the power-receiving device 110 that is provided in the house 100. Once the electric vehicle 3 has been moved backwards to a position where power is able to be supplied to the house 100, the electric vehicle 3 is stopped.

Next, when the user issues a power supply command to the electric vehicle 3 while the electric vehicle 3 is stopped, the supply of power to the house 100 is started that has power-consuming equipment and is destination of the power supply. Specifically, when a power supply command is issued by the user, the control unit 36 switches the first contactor 32 to an open state so that the motor 14 and the inverter 31 are disconnected from each other, and also switches the second contactor 33 to a closed state so that the power-supplying coil 15 and the inverter 31 are connected to each other. In addition, the wireless power supply control unit 36b of the control unit 36 creates in the inverter 31 the gate signal that is required to create the two-phase AC power (i.e., the U-phase and the V-phase AC power) that is to be supplied to the power-supplying coil 15, and outputs this gate signal to the gate signal selection unit 36c.

Next, the gate signal selection unit 36c selects only the gate signal input from the wireless power supply control unit 36b, and outputs it to the gate drive circuit 35. The gate drive circuit 35 converts the voltage of the gate signal input from the gate signal selection unit 36c, and then outputs it to the inverter 31. The inverter 31 creates two-phase AC power (i.e., U-phase power and V-phase power) from the power (i.e., the DC power) stored in the storage cell 11 based on the gate signal that was input from the gate drive circuit 35, and then supplies this two-phase AC power to the power-supplying coil 15.

As a result, AC power is supplied wirelessly to the power-receiving device 110 via an electromagnetic coupling circuit that is formed by the power-supplying coil 15 and the power-receiving coil 111. The AC power supplied to the power-receiving device 110 is converted into DC power by the power-receiving circuit 112, and this converted DC power is then supplied to the interior of the house 100.

As a result of the above, in the present embodiment, the electric vehicle 3 is moved adjacent to the house 100 so that the power-supplying coil 15 of the electric vehicle 3 faces the power-receiving coil 111 of the power-receiving device 110 that is provided in the house 100. Power can be supplied to the house 100 as a result of this operation alone being performed. As a consequence, power can be supplied easily even if the user does not perform the task of fitting the plug of a cable either outside the vehicle or outside the house into a socket provided in the electric vehicle or in the house, as is the case in the conventional technology. Moreover, the power-supplying coil 15 of the electric vehicle 3 and the power-receiving coil 111 of the power-receiving device 110 that is provided in the house 100 are completely covered respectively by the weatherproof covers 15a and 111a. Because of this, it is possible to prevent the ingress of rainwater or foreign objects (for example, insects) and the like into the power-supplying coil 15 and the power-receiving coil 111. As a result of this, because electrical connection faults do not occur, the task of maintenance can be performed easily. Furthermore, in the present embodiment, because the inverter 31 can be used to supply power to both the motor 14 and the power-supplying coil 15, the manufacturing costs of the electric vehicle 3 can be reduced.

A mobile power supply device and method have been described above based on embodiments of the present invention, however, the present invention is not limited to the above-described embodiments and can be altered freely within the range of the present invention. For example, in the above-described embodiments, a description is given of a mobile power supply device that is able to both supply power wirelessly to the outside and perform charging using power that is supplied wirelessly from the outside, however, it is also possible for the present invention to be applied to a mobile power supply device that is only able to supply power wirelessly to the outside.

Provided that the power-supplying coil 15 and power-receiving coil 111, and the power-receiving coil 17 and power-supplying coil 121 of the first and third embodiments are placed in positions adjacent to each other where they are able to transfer power wirelessly, then the locations where they are installed can be arbitrarily chosen. For example, the power-supplying coil 121 can be provided in the house 100, while the power-receiving coil 111 may also be provided on the ground. In these cases, the power-receiving coil 17 or the power-supplying coil 15 is placed in an appropriate position in the electric vehicles 1 or 3, namely, in a position where the coils are adjacent to each other when the vehicle is stopped and power is able to be transferred wirelessly. Moreover, in the second embodiment, it is also possible for the power-transferring coil 131 to be provided in the house 100, and for the power-transferring coil 21 to be placed in the rear portion of the electric vehicle 2. Furthermore, the coil may also be provided in the side surface or front surface of the electric vehicles 1 through 3.

Moreover, in the above-described embodiments, a description is given of examples in which the object to be supplied with power is an electric vehicle in which a storage cell has been installed. However, the present invention can also be applied to plug-in hybrid vehicles, and to transporting vehicles and the like. Furthermore, the present invention can also be applied to driverless moving vehicles.

The power-receiving circuit 112 that is provided in the power-receiving device 110 of the house 100 shown in FIG. 1 and FIG. 5, and the power-transferring circuit 132 that is provided in the power-transferring device 130 shown in FIG. 3 require a small-capacity power supply that is used to drive their internal control circuits. As this small-capacity power supply, it is possible to use a power generator that generates power using natural energy such as sunlight or wind power or the like, and it is also possible to use a small-sized storage cell. If a small-sized storage cell is used, then it is desirable that it is charged using power supplied from the electric vehicles 1 through 3.

Moreover, it is also possible for the control circuits provided internally in the power-receiving circuit 112 shown in FIG. 1 and FIG. 5 and in the power-transferring circuit 132 shown in FIG. 3 to be driven using power supplied from the electric vehicles 1 through 3. In this case, the aforementioned power generator and small-sized storage cell can be omitted, and this makes the present invention suitable for supplying power to houses where it is normally difficult to perform maintenance such as emergency shelters and the like.

Moreover, in the above-described embodiments, when power is being supplied from the electric vehicles 1 through 3 to the house 100, it is also possible for the electric vehicles 1 through 3 to receive information about the power-receiving conditions from the house 100 by means of wireless communication or the like, and for the power-receiving conditions of the house 100 to be improved by adjusting the frequency of the AC power in accordance with the power-receiving conditions.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

INDUSTRIAL APPLICABILITY

According to the mobile power supply device of the present invention, it is possible to easily supply power without having to perform the task of connecting a cable. Moreover, no electrical connection faults occur in the power-supplying coil that is covered by a weatherproof component. As a result, the task of maintaining the power-supplying coil can be performed easily.

DESCRIPTION OF REFERENCE SIGNS 1, 2, 3 . . . Electric vehicles
11 . . . Storage cell
12 . . . Contactor
13 . . . Inverter
14 . . . Motor
15 . . . Power-supplying coil
15a . . . Weatherproof cover
16 . . . Power-supplying circuit (Power converter)
17 . . . Power-receiving coil
18 . . . Power-receiving circuit
19 . . . Charging device
21 . . . Power-transferring coil
21a . . . Weatherproof cover
22 . . . Power-transferring circuit
111 . . . Power-receiving coil
121 . . . Power-supplying coil
131 . . . Power-transferring coil
31 . . . Inverter (Power converter)
32 . . . First contactor
33 . . . Second contactor
34 . . . Rotation detector
35 . . . Gate drive circuit
36 . . . Control unit
36a . . . Motor control unit
36b . . . Wireless power supply control unit
36c . . . Gate signal selection unit
L1, L2, L3 . . . Switching legs
15b . . . Coil
15c . . . Capacitor
111b . . . Coil
111c . . . Capacitor

The invention claimed is:

1. A mobile power supply device that is capable of supplying power stored in a storage cell to outside of the mobile power supply device, comprising:
    a power-supplying coil that is covered by a weatherproof component and that, together with an external power-receiving coil, forms a first electromagnetic coupling circuit;
    a power converter that converts DC power stored in the storage cell into AC power and then supplies the AC power to the power-supplying coil;
    a power-receiving coil that, together with an external power-supplying coil, forms a second electromagnetic coupling circuit;
    a power-receiving circuit that receives power that is supplied wirelessly from outside of the mobile power supply device via the second electromagnetic coupling circuit that is formed by the external power-supplying coil and the power-receiving coil;
    a charging device that charges the storage cell using power received by the power-receiving circuit;
    a motor that generates power used for movement;
    a drive circuit that drives the motor using power stored in the storage cell; and
    a switching circuit that switches between connecting the power converter, the power-receiving circuit, and the drive circuit to the storage cell and disconnecting them from the storage cell,
    wherein:
    when power is discharged from the storage cell, the switching circuit is controlled so that the storage cell, the drive circuit, the power converter, and the power-receiving circuit are connected, and
    when the storage cell is charged, the switching circuit is controlled so that the storage cell, the drive circuit, the power converter, and the power-receiving circuit are disconnected.

2. The mobile power supply device according to claim 1, wherein the power-receiving coil is covered by a weatherproof component.

3. The mobile power supply device according to claim 2, wherein there is provided:
    a power supply destination setting device that sets the destination for the supply of AC power output from the power converter to either the power-supplying coil or the motor.

4. The mobile power supply device according to claim 1, wherein there is provided:
    a power supply destination setting device that sets the destination for the supply of AC power output from the power converter to either the power-supplying coil or the motor.

5. A mobile power supply device that is capable of supplying power stored in a storage cell to outside of the mobile power supply device, comprising:

a power-transferring coil that is covered by a weatherproof component and that, together with an external power-transferring coil, forms an electromagnetic coupling circuit;

a power-transferring circuit that, out of a first operation in which power that is stored in the storage cell is supplied wirelessly to outside of the mobile power supply device via the electromagnetic coupling circuit, and a second operation in which power that is supplied wirelessly from outside of the mobile power supply device via the electromagnetic coupling circuit is received, performs at least the first operation;

a motor that generates power that is used for movement;

a drive circuit that drives the motor using power stored in the storage cell; and a switching circuit that switches between connecting the power-transferring circuit and the drive circuit to the storage cell, and disconnecting them from the storage cell, wherein:

when power is discharged from the storage cell, the switching circuit is controlled so that the storage cell, the drive circuit, and the power-transferring circuit are connected, and when the storage cell is charged, the switching circuit is controlled so that the storage cell, the drive circuit, and the power-transferring circuit are disconnected.

6. The mobile power supply device according to claim 5, wherein there is provided a charging device that, when the second operation is performed by the power-transferring circuit, charges the storage cell using power received by the power-transferring circuit.

\* \* \* \* \*